(12) United States Patent
Khurana et al.

(10) Patent No.: US 9,942,345 B2
(45) Date of Patent: Apr. 10, 2018

(54) WEB SERVER CACHING FOR PERFORMANCE IMPROVEMENT

(75) Inventors: Varun Khurana, Bangalore (IN); Rashmi Badan, Belgaum (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 912 days.

(21) Appl. No.: 12/562,008

(22) Filed: Sep. 17, 2009

(65) Prior Publication Data
US 2011/0066709 A1    Mar. 17, 2011

(51) Int. Cl.
| | |
|---|---|
| G06F 15/16 | (2006.01) |
| G06F 15/177 | (2006.01) |
| H04L 29/08 | (2006.01) |
| G06F 17/30 | (2006.01) |

(52) U.S. Cl.
CPC ...... *H04L 67/2842* (2013.01); *G06F 17/3089* (2013.01); *G06F 17/30* (2013.01); *G06F 17/30867* (2013.01)

(58) Field of Classification Search
CPC . H04L 67/2842; G06F 17/30; G06F 17/3089; G06F 17/30867

USPC .......................................................... 709/222
See application file for complete search history.

(56) References Cited

U.S. PATENT DOCUMENTS

| | | | | |
|---|---|---|---|---|
| 7,069,497 | B1* | 6/2006 | Desai | G06F 17/3089 |
| | | | | 707/E17.116 |
| 2002/0161767 | A1* | 10/2002 | Shapiro | G06F 17/3089 |
| 2003/0028595 | A1* | 2/2003 | Vogt | G06Q 10/10 |
| | | | | 709/204 |
| 2008/0263566 | A1* | 10/2008 | Buerge | G06F 17/30 |
| | | | | 719/317 |

\* cited by examiner

*Primary Examiner* — David Lazaro
*Assistant Examiner* — Xiang Yu
(74) *Attorney, Agent, or Firm* — Marger Johnson

(57) ABSTRACT

A machine-controlled method may include a web server identifying data to be cached and caching the data at the web server, the data originating from an external data source, an application server generating metadata that corresponds to the cached data, determining whether external data corresponding to the cached data has changed, receiving information corresponding to the changed external data, and updating the cached content based on the metadata and the received information.

19 Claims, 5 Drawing Sheets

WEB SERVER CACHING FOR PERFORMANCE IMPROVEMENT

BACKGROUND

Current web-based application systems typically perform data caching based on a timeout scheme or according to some other type of lifetime-based logic. In other words, there is usually a fixed amount of time after which a cached web-based component or object is refreshed, regardless of whether the component or object actually changes before the end of the time period. Thus, current systems based on such timeout and lifetime-based logic typically force updates to cached data regardless of whether the cached data actually needs to be refreshed.

Furthermore, current systems provide no commonly used or widely accepted mechanism or protocol by which a web server can update cached data at times other than the planned or scheduled update times.

As a direct result of these and various other unstated factors, current web-based systems have a high level of inefficiency as well as significant bandwidth waste in connection with the caching of web-based data.

Accordingly, there remains a need for a way to address these and other deficiencies associated with the prior art.

DETAILED DESCRIPTION

Figure 1:
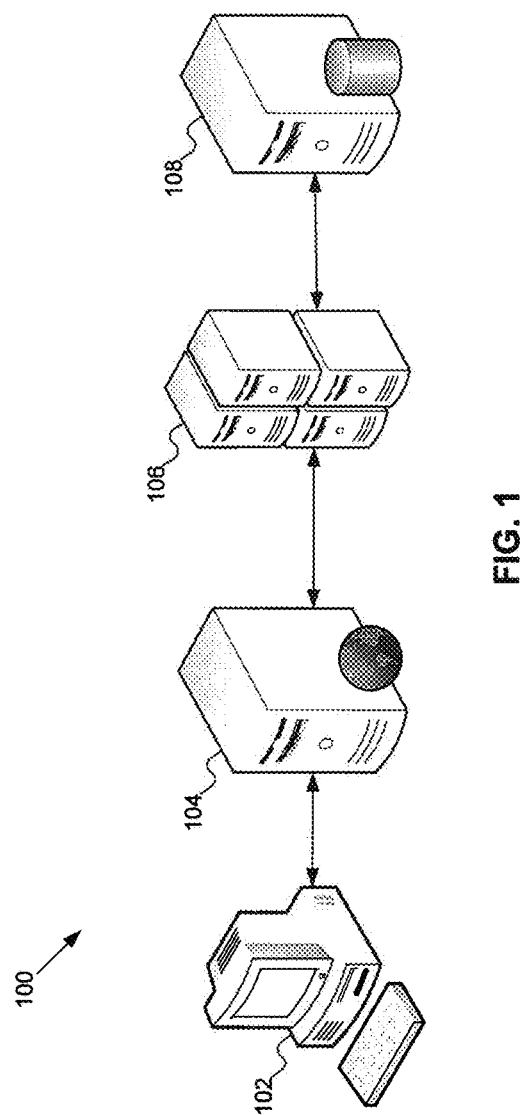
FIG. 1 illustrates a first example of a web-based system in which embodiments of the disclosed technology may be implemented.

FIG. 1 illustrates an example of a web-based system 100 having a client 102, a web server 104, an application server 106, and a database server 108. The application server 106 and database server 108 are generally referred to as backend servers. One having ordinary skill in the art will appreciate that there are virtually limitless combinations of the illustrated components and that not every web-based system will have all of the individual components provided in the example. Furthermore, some of the separate components may be implemented with the same physical device. For example, the application server 106 and the database server 108 may reside on a single machine.

Figure 2:
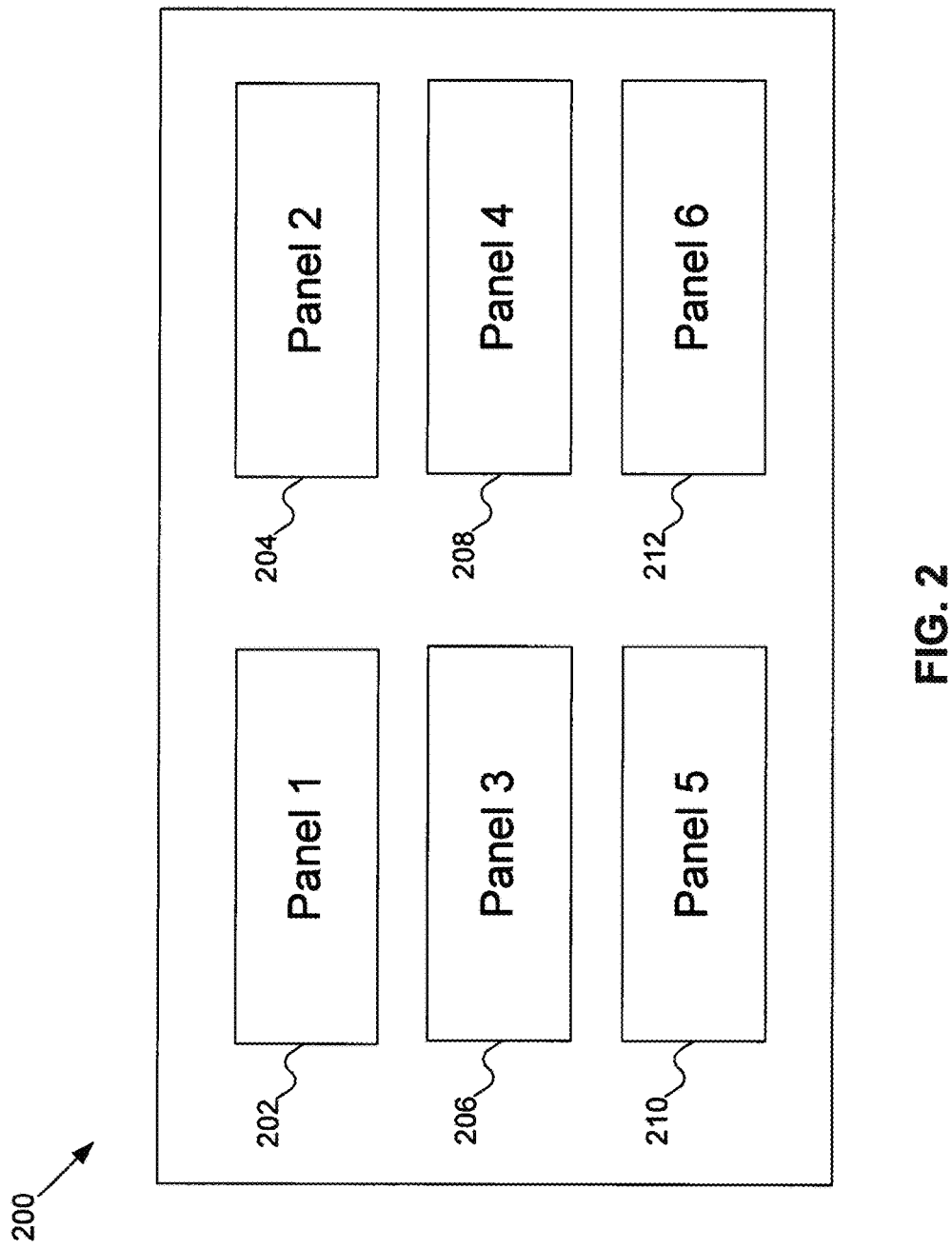
FIG. 2 illustrates an example of a webpage displayed at a client, such as the client in the web-based system illustrated in FIG. 1.

FIG. 2 illustrates an example of a webpage 200 displayed at a client, such as the client 102 in the web-based system 100 illustrated in FIG. 1. The webpage 200 includes six independent panels 202-212, where each of the panels 202-212 represents a display of a different type of information. For example, Panel 1 (202) may include a user's email inbox, Panel 2 (204) may include a search engine interface, Panel 3 (206) may include a listing of links to documents such as those most recently accessed by the user, Panel 4 (208) may include a listing of links to communities to which the user belongs, Panel 5 (210) may include a listing of current headlines, and so on.

Several of the individual panels 202-212 in the illustrated example rely on internal or external data sources. For example, the email inbox displayed in Panel 1 (202) relies on web-based data that may be stored at the user's machine, on the web server, or at an application server. The links to documents displayed in Panel 3 (206) rely on web-based data stored at one or more machines, depending on where the linked documents actually reside. Furthermore, the search engine interface, links to communities, and headlines displayed at Panels 2 (204), 4 (208), and 5 (210), respectively, rely on web-based data that is likely stored at locations that are external to both the user's machine and the associated web server.

As used herein, web-based data generally refers to virtually any type of components or objects that may be provided to a client and may include text data, image data, and video data. For example, a website or webpage often includes various sub-sections or panels, such as the six panels 202-212 of the webpage 202 illustrated in FIG. 2, where each sub-section or panel displays certain web-based data that is retrieved from a corresponding data source such as an internal database or an external data server. Web-based data may also include mashups, which generally refer to combinations of two or more different types of web-based data. Mashups typically involve displays that are populated by content from a number of separate and distinct data sources.

As used herein, web-based data caching refers to the duplication and storage of certain web-based data at a location that is remote from the original data source. Web-based data caching is typically performed to reduce the amount of time needed to provide the web-based data to a client. Web-based data caching may also be used to reduce the amount of bandwidth used in connection with providing the web-based data to the client.

A remote location typically refers to but does not necessarily require a separate machine that may be at an entirely different physical location from that of the machine hosting the original data source. For example, web-based data from an application server that resides on a particular machine at a first location may be cached at a web server that is hosted by a different machine at a second location. Alternatively, the application server and web server may both reside on the same machine.

Embodiments of the disclosed technology introduce a new protocol for increased efficiency and effectiveness of web-based data caching. For example, web-based data components and objects at the application server level may be stored at the web server level. The web server may identify which components or objects are to be cached based on a set of rules or in accordance with a specification provided by an application developer in a Properties or XML file during application development, for example.

Each web-based data component or object to be cached at the web server level may have certain metadata associated with it. In certain embodiments, the metadata may be stored with the corresponding data. The metadata may contain information pertaining to any or all of the following: the type of data to be cached, a "last update" time for the component or object, a "frequency of updates" parameter for the component or object, and a "frequency of usage" parameter. Information pertaining to the type of data may specify whether the data is static or dynamic and whether the data is text data, image data, video data, or a mashup. This information may also specify whether the component or object depends on real-time updates to a database or other data source. Embodiments of the disclosed technology are not limited to these particular items, however, as there are a number of additional pieces of information for a given component or object that may be readily implemented in connection with those listed above.

The metadata stored with each component or object may be used in connection with determining whether to update the cached web-based data at the web server. For example, whenever data at an application server corresponding to cached data at a web server changes, the system may notify the web server of the change such that the web server may refresh the cached data using the most recent data from the application server. In certain embodiments, the application server may rely on data stored by a database server. If such data at the database server changes, the database server may notify the application server of the change(s) and the application server may then act in accordance with the techniques described herein.

The system may determine whether certain cached web-based data should be updated or refreshed from an application server end in accordance with either a push model using control messages or a pull model using custom tags, depending on the client usage scenarios. Push models and pull models in accordance with the disclosed technology are described in detail below.

In certain embodiments, the web server may maintain a mapping mechanism that can be used interpret a requested URL to determine whether the requested content is present in the web server cache and, if so, the exact location where the cache is maintained. The web server may also rely on the mapping mechanism to determine whether the content needs to be obtained from the application server or from some other location such as a remote database.

Referring to the example illustrated in FIG. 2, each of the panels 202-212 represent unique entities that may be cached at the web server provider. Each of the panels 202-212 may have a unique identification and mapping mechanism using the associated metadata stored with the data in the web server cache. The following is a specific example of metadata for Panel 4 (208) of the illustrated webpage 200:

---

Identification : WebCenterPageTitle-Sample;Location-Panel4
Information Type : InformationType-Text;InformationNature-Dynamic
Information Source : DataSource-OracleDatabase;Driver:OCI;Version-11g
Frequency of usage : 7
Frequency of updates : 3
URL : ApplicationLevelURL:
http://webcenter.us.oracle.com/webcenter/faces/oracle/web-center/page/scopedSamle/sb7fd06_8539/Page18.jspx;jsessionid=P4gTKK1MgwG2pP8PBLrNwkS7QPg18?wc.contextURL=%2Fspaces%2Fsucceedatwork&_adf.ctrl-state=12wi6kx0e6_4

---

The "frequency of usage" and "frequency of updates" parameters in the example each represent values on a 10-point scale. The URL listed as the "ApplicationLevelURL" represents an Oracle® WebCenter page that can be used by the web server to map the pertinent page (Page 18) and panel (Panel 4) to the location on disk where the web server maintains the cache. The web server may then update the cached data responsive to the changes in the underlying data at the application server level.

Figure 3:
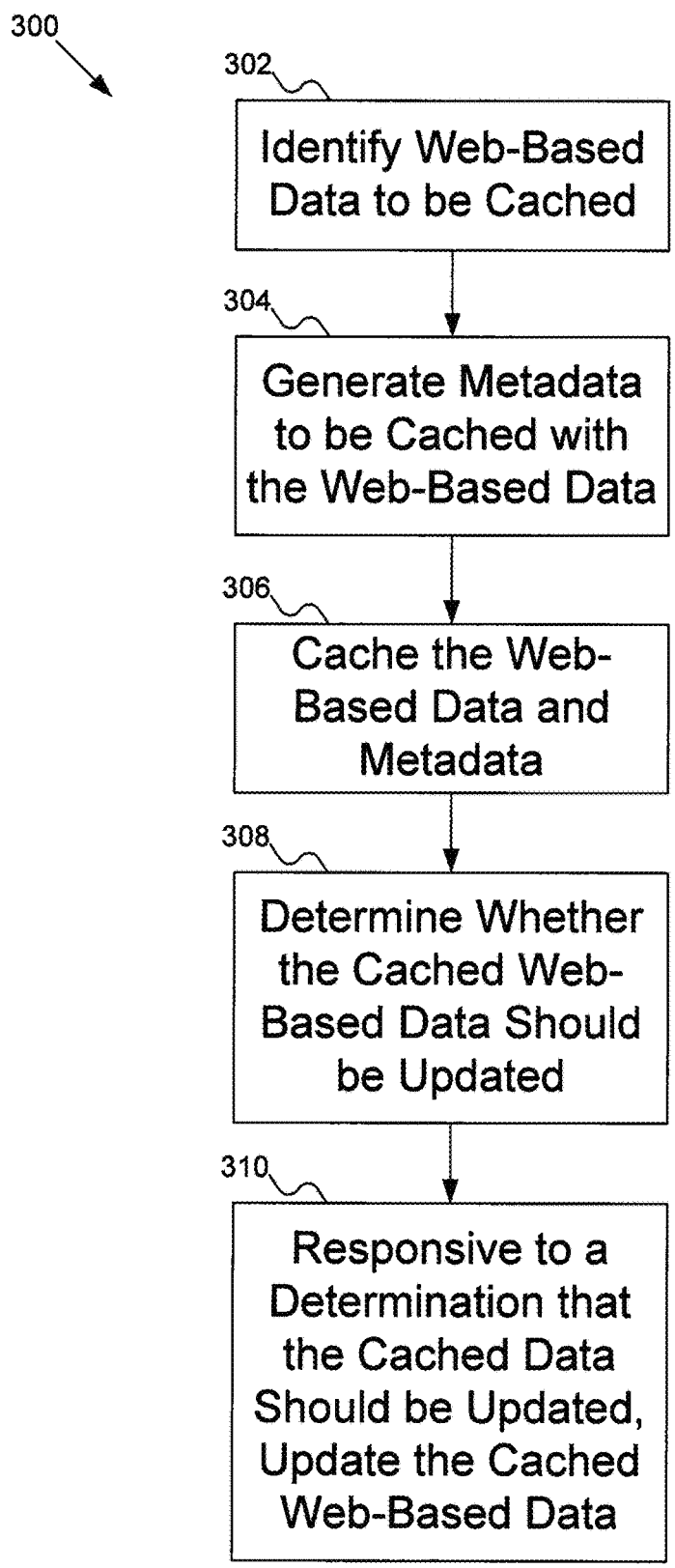
FIG. 3 illustrates a first example of a machine-controlled method in accordance with implementations of the disclosed technology.

FIG. 3 illustrates a first example of a machine-controlled method 300 in accordance with implementations of the disclosed technology. At 302, the web server identifies web-based data to be cached. For example, the web server may select any of the panels 202-212 of the webpage 200 illustrated in FIG. 2 to be cached based on the type of data, frequency of use, etc.

At 304, the web server generates metadata to be cached in connected with the web-based data that the web server has deemed cachable. The metadata may include information that identifies the web-based data to be cached as well as the source of the data, among other things. The web server may cache the web-based data and the metadata together, as shown at 306.

At 308, the application server decides whether the cached web-based data should be updated or refreshed. For example, the application server may implement a push model using control messages to communicate with the web server and indicate that the underlying data for the cached data has changed. Alternatively or in addition thereto, the web server may implement a pull model using custom tags to determine whether underlying data for the cached data has changed at the application server level.

Once the web server has determined whether the underlying data has changed, the web server may then determine whether to update the cached content based on the change(s) to the underlying data. For example, the web server may be set to always update the cached data responsive to any change in the underlying data. Alternatively, a user may indicate a particular level or threshold to be met before updating the data. For example, the user may indicate that the web server should not perform an update unless the change in the underlying data is older than a certain amount of time such as an hour. If the web server determines that the cached content should be updated, the web server may then update the cached content accordingly, as shown at 310.

In certain embodiments, the web server receives the updated information directly via a control message, for example. Alternatively, the web server may query the application server or other data source to retrieve the changed data or, if the data has changed again, the most recent data available. As a result, the web server can advantageously maintain the most recent content available for the end user without needing to constantly send queries to the application server. Furthermore, embodiments of the disclosed technology may be implemented at the component or object level, at the panel level, or at the page level. Thus, the disclosed technology can provide a significant range of granularity in keeping the web-based data up-to-date.

Among the many advantageous features of the disclosed technology is significantly more intelligent caching. This is because a web server may be set to update certain cached web-based data only when the underlying data has changed. Also, the system may choose to update only the sections or sub-sections of web-based data that correspond to changed data rather than the entire cache. Furthermore, embodiments may apply to virtually any given data type, including complex data types such as mashups. Thus, embodiments may provide enhanced performance improvement to an end user as well as a significant reduction in response time. For example, because the web server will keep the cached content up-to-date, JavaServer Pages (JSPs) do not need to be repeatedly and unnecessarily compiled at the application server.

The gain in performance may result in not only a significant reduction in the processing load on the servers but also a reduction of the bandwidth usage. This can lead to a direct and significant increase in the delivery speed and efficiency experienced by the end user at the client. This can be a competitive advantage for web-based application providers. Also, because the embodiments described herein may be implemented across different companies and technologies, they can be leveraged to achieve a drastic performance improvement across companies for various types of web-related applications.

For example, the disclosed technology may be readily implemented in Oracle® WebCenter Suite, which is a complex portal platform application that relies heavily on JavaServer Pages (JSPs). Currently, each time a client accesses a page within WebCenter Suite, the JSP for that page is translated, compiled, loaded, and instantiated before the content is served to the client as an HTML page. Using the disclosed technology, however, the HTML code that is rendered at the client end may now be cached at the web server level. This cached content is what the system may deliver to the client in response to subsequent requests for the page, thereby avoiding the JSP lifecycle and, as a result, reducing the load on the application server. For further requests, the web server may deliver to the client data from the web server itself and thus avoid needing to request the content from the application server. As noted above, such action may significantly increase the efficiency and speed for the end user at the client.

Implementations Incorporating a "Push" Model from an Application Server to a Web Server using Control Messages Certain implementations of the disclosed technology may include the use of a control message from an application server to a web server, for example. Such a control message can be used to direct the web server to update certain web-based data cached at the web server. For example, the application server may send a control message over HTTP or some other suitable protocol to the web server. The web server may use the control message to update the cached web-based data every time the underlying data corresponding to the cached data changes or when certain user-specified criteria are met, for example.

As used herein, a control message refers to a message containing information that identifies the corresponding web-based data cached by the web server as well as information the web server may use to determine whether the cached web-based data should be updated or refreshed. An example of a structure for a control message is as follows:

```
<start-line>
<message-headers>
<control message>
<update url="...">
<metadata="...">
[data]
<end-line>
```

The following is a specific example of a control message in accordance with the disclosed technology:

```
<ControlMessageType=UpdateNotification>
<MessageHeaders>
    <Identification = WebCenterPageTitle-Sample;Location-Panel4>
    <Information Type : InformationType-Text;InformationNature-
    Dynamic>
    <Information Source : DataSource-
    OracleDatabase;Driver:OCI;Version-11g>
    <URL=http://webcenter.us.oracle.com/webcenter/faces/oracle/web-
    center/page/scopedSamle/sb7fd06_8539/Page18.jspx;jsessionid=
    P4gTKK1MgwG2pP8PBLrNwkS7QPg18?wc.contextURL=
    %2Fspaces%2Fsucceedatwork&_adf.ctrl-state=12wi6kx0e6_4>
</MessageHeaders>
[data]
<Data:EmployeeName="Scott Tiger";Org=Oracle;Location=IDC;...>
</ControlMessageType=UpdateNotification>
```

The <MessageHeaders> section in the example may include information pertaining to the data type of the cached content as well as the location of the originating data source. The [data] field may contain the new or updated information to be stored in connection with the corresponding web-based data cached at the web server. The information in the [data] field may originate from an internal or external datastore, for example.

Upon receipt of the control message from the application server, the web server may use a custom module running on the web server to interpret the control message and use the data in the control message to update the corresponding cached components or objects. For example, the web server may use on the custom module to interpret the URL and map the URL to the location on the web server where the content is actually cached. Depending on the information within the control message, the web server may either clear and reload the entire cache or refresh only the specific parts to be updated. One having ordinary skill in the art will appreciate that the custom module may be easily pluggable within other devices. That is, alternative embodiments may include an implementation of the custom module on the application server or some other device within the system.

Figure 4:
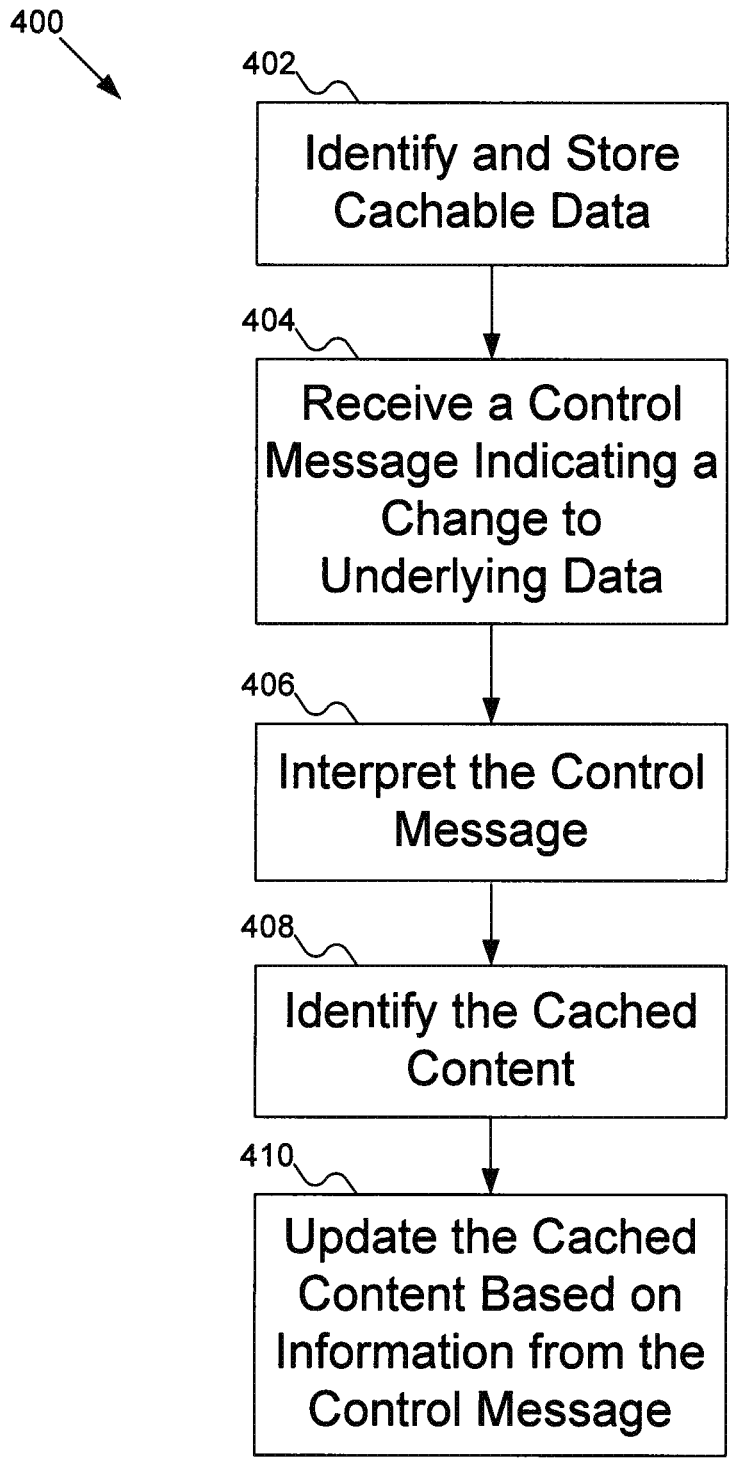
FIG. 4 illustrates a second example of a machine-controlled method in accordance with implementations of the disclosed technology.

FIG. 4 illustrates an example of a machine-controlled method 400 that incorporates the use of control messages. At 402, the web server identifies cachable web-based data and stores the content in the web server cache. In certain embodiments, the web server may also store metadata corresponding to the cached content therewith.

At 404, the web server receives a control message from an application server indicating a change in certain underlying data that corresponds to the cached content. The web server may use a custom module running on the web server to interpret the control message, for example, as shown at 406.

At 408, the web server identifies the cached content that corresponds to the changed data at the application server. For example, the web server may use a mapping mechanism to determine the cached data's location via a URL provided by the control message. Once the web server locates the cached content, the web server may update the data based on the information from the control message, as shown at 410. For example, the web server can perform a complete update of the cached content or a partial refresh if only part of the cached content would be affected by the change in the underlying data.

Implementations Incorporating a "Pull" Model from a Web Server to an Application Server using Custom Tags Certain implementations of the disclosed technology may include the use of custom tags embedded in HTML code transferred between a web server and an application server. Alternatively or in addition thereto, custom tags may be implemented as custom HTTP headers. In situations where an application server sends content to a web server, the application server may embed one or more custom tags within the content itself. The web server may use a custom module running on the web server, for example, to interpret these custom tags. The web server, however, need not pass the custom tags on to the client. After a specified time interval, the web server may subsequently send a control message to the application server to determine whether the content has been updated or has otherwise changed. If so, the web server may proceed to refresh the cached content accordingly.

As used herein, a custom tag refers to HTML code or a HTTP header that a web server may use to determine whether to pursue a potential update or refresh of cached content. An example of a structure for a custom tag is as follows:

```
<html>
<head>...</head>
<custom-tag> refresh="time-interval", server="...", <...> </custom-tag>
<body>
.
.
.
</body>
</html>
```

The following is a specific example of a custom tag in accordance with the disclosed technology:

```
<html>
<head>WebCenter Page 18</head>
<CustomTags>
    <UpdateCheckInterval="7", server="webcenter.us.oracle.com", <...>
    </UpdateCheckInterval>
    <Identification = WebCenterPageTitle-Sample;Location-Panel4>
    <Information Type : InformationType-Text;InformationNature-
    Dynamic>
    <Information Source : DataSource-
    OracleDatabase;Driver:OCI;Version-11g>
    <URL=http://webcenter.us.oracle.com/webcenter/faces/oracle/web-
    center/page/scopedSamle/sb7fd06_8539/Page18.jspx;jsessionid=
    P4gTKK1MgwG2pP8PBLrNwkS7QPg18?wc.contextURL=
    %2Fspaces%2Fsucceedatwork&_adf.ctrl-state=12wi6kx0e6_4>
</CustomTags>
<body>
EmployeeName="Scott Tiger"....
....
</body>
</html>
```

The custom tag in the example establishes a time period of seven seconds via the "UpdateCheckInterval" parameter. Thus, once the specified period of seven seconds has passed, the web server may send the following control message to the application server to determine whether the cached content has been updated or has otherwise changed:

```
<ControlMessageType=UpdateNotification>
<MessageHeaders>
    <Identification = WebCenterPageTitle-Sample;Location-Panel4>
    <Information Type : InformationType-Text;InformationNature-
    Dynamic>
    <Information Source : DataSource-
    OracleDatabase;Driver:OCI;Version-11g>
    <URL=http://webcenter.us.oracle.com/webcenter/faces/oracle/web-
    center/page/scopedSamle/sb7fd06_8539/Page18.jspx;jsessionid=
    P4gTKK1MgwG2pP8PBLrNwkS7QPg18?wc.contextURL=
    %2Fspaces%2Fsucceedatwork&_adf.ctrl-state=12wi6kx0e6_4>
</MessageHeaders>
<Query=CheckForUpdates />
</ControlMessageType=UpdateNotification>
```

If the pertinent data has been updated, the application server can respond by returning the control message to the web server with the updated information.

Consider an example in which a company hires a new employee and adds a new entry for the employee to the corresponding database. In certain embodiments, the application server may immediately send a control message to the web server notifying the web server of the new information. In the present example, however, the web server may send a control message to the application server after a specified amount of time has passed or some other criteria specified by the custom tag has been met. The application server may respond by creating a new control message to send to the web server or by returning the control message originally received from the web server to the web server but with an additional HTML snippet indicating the addition of the new employee as shown below:

```
<html>
<head>WebCenter Page 18</head>
<CustomTags>
    <UpdateCheckInterval="7", server="webcenter.us.oracle.com", <...>
    </UpdateCheckInterval>
    <Identification = WebCenterPageTitle-Sample;Location-Panel4>
    <Information Type : InformationType-Text;InformationNature-
    Dynamic>
    <Information Source : DataSource-
    OracleDatabase;Driver:OCI;Version-11g>
    <URL=http://webcenter.us.oracle.com/webcenter/faces/oracle/web-
    center/page/scopedSamle/sb7fd06_8539/Page18.jspx;jsessionid=
    P4gTKK1MgwG2pP8PBLrNwkS7QPg18?wc.contextURL=
    %2Fspaces%2Fsucceedatwork&_adf.ctrl-state=12wi6kx0e6_4>
</CustomTags>
<body>
EmployeeName="JOE EMPLOYEE"....
....
</body>
</html>
```

The application server in the example may provide the information pertaining to the new employee using the "EmployeeName" field in the returned control message shown above.

If there is no change in the data, however, the application server may respond to the web server by sending the following control message, which indicates that the underlying data has not changed via the "QueryResult" field:

```
<ControlMessageType=UpdateNotification>
<MessageHeaders>
    <Identification = WebCenterPageTitle-Sample;Location-Panel4>
    <Information Type : InformationType-Text;InformationNature-
    Dynamic>
    <Information Source : DataSource-
    OracleDatabase;Driver:OCI;Version-11g>
    <URL=http://webcenter.us.oracle.com/webcenter/faces/oracle/web-
    center/page/scopedSamle/sb7fd06_8539/Page18.jspx;jsessionid=
    P4gTKK1MgwG2pP8PBLrNwkS7QPg18?wc.contextURL=
    %2Fspaces%2Fsucceedatwork&_adf.ctrl-state=12wi6kx0e6_4>
</MessageHeaders>
<QueryResult=NoChangeInData>
</ControlMessageType=UpdateNotification>
```

Figure 5:
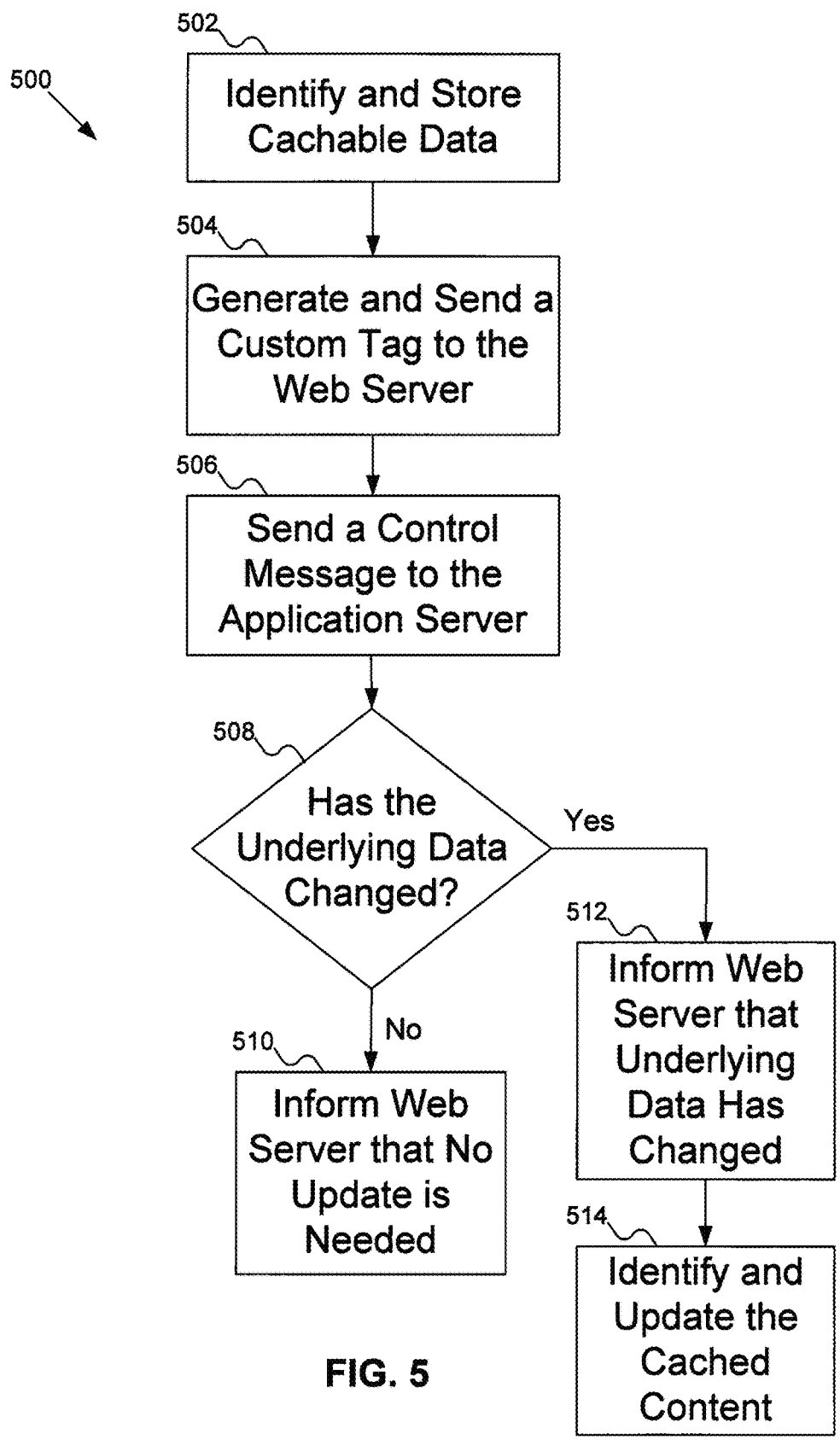
FIG. 5 illustrates a third example of a machine-controlled method in accordance with implementations of the disclosed technology.

FIG. 5 illustrates an example of a machine-controlled method 500 incorporating custom tags. At 502, the web server identifies cachable web-based data and stores the content in the web server cache. The web server can also store metadata corresponding to the cached content therewith.

At 504, the application server may generate a custom tag identifying the cached content and indicating one or more parameters to be used by the web server in determining whether to send a control message to the application server. After the parameters have been met, the web server may send a control message to the application server, as shown at 506.

Once the application server receives the control message from the web server, the application server may then determine whether the underlying data corresponding to the cached content has changed, as indicated at 508. If the underlying data has not changed, the application server can send a control message to the web server indicating that no update is needed at this time, as indicated at 510. In certain embodiments, the control message may be a simple reply to the control message received from the web server but with the insertion of language that there is no change via a "QueryResult" field, for example.

If the underlying data has changed, however, the application server may send a control message to the web server indicating that the underlying data has changed, as indicated at 512. In certain embodiments, the application may also insert the actual data change(s) in the control message itself. Alternatively or in addition thereto, the application server may include a URL or some other type of link so that the web server may use the information to retrieve the updated information directly from the data source.

At 514, the web server identifies the cached content that corresponds to the changed web-based data indicated by the application server and subsequently updates the cached data based on the information from the control message. For example, the web server may perform a complete update of the cached content or a partial refresh of only part of the cached content would be affected by the change in the underlying data.

General Description of a Suitable Machine in which Embodiments of the Disclosed Technology can be Implemented The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, and the like.

Typically, a machine includes a system bus to which processors, memory such as random access memory (RAM), read-only memory (ROM), and other state-preserving medium, storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices such as keyboards and mice, as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory, such as RAM and ROM, or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

We claim:

1. A machine-controlled method, comprising:
a web server identifying data to be cached, the data originating from a plurality of external data sources;
the web server caching the data at the web server;
an application server generating metadata corresponding to the cached data, the metadata including a last update time, a "frequency of updates" parameter, and a "frequency of usage" parameter;
a client displaying a webpage including a plurality of panels, each panel providing a different type of information corresponding to the cached data, a first one of the plurality of panels including an email inbox and a second one of the plurality of panels including a search engine interface;
at least one of the web server and the application server determining that external data corresponding to the cached data has changed;
the web server receiving information corresponding to the changed external data; and
responsive to the determining, the web server updating the cached data at the web server and the client updating at least one of the plurality of panels based on the metadata and the received information.

2. The machine-controlled method of claim 1, wherein the determining is based at least in part on a control message received by the web server from the application server.

3. The machine-controlled method of claim 1, further comprising the application server sending a custom tag to the web server, the custom tag corresponding to the cached data.

4. The machine-controlled method of claim 3, wherein the determining comprises the web server sending a control message to the application server responsive to the custom tag.

5. The machine-controlled method of claim 4, wherein the determining further comprises the application server revising the control message by inserting update information into the control message and returning the revised control message to the web server.

6. The machine-controlled method of claim 5, wherein the inserted update information comprises the changed external data.

7. The machine-controlled method of claim 1, wherein the receiving comprises the web server retrieving the external data directly from the external data source via the application server.

8. The machine-controlled method of claim 1, wherein the updating comprises a partial refresh of a portion of the cached data.

9. The machine-controlled method of claim 1, wherein the updating comprises a complete update of the cached data.

10. One or more tangible computer-readable media storing machine-executable instructions that, when executed by a processor, cause a computer to perform the machine-controlled method of claim 1.

11. The machine-controlled method of claim 1, wherein each different type of information further includes at least one of a group consisting of the following: a listing of links to recently-accessed documents, a listing of communities, and a listing of current headlines.

12. A system, comprising:
a web server configured to identify data to be cached, the data originating from a plurality of external data sources, wherein the web server is further configured to cache the data, determine whether external data corresponding to the cached data has changed, receive information corresponding to the changed external data, and update the cached data responsive to a determination that the external data has changed;
an application server configured to generate metadata corresponding to the cached data, the metadata including a last update time, a "frequency of updates" parameter, and a "frequency of usage" parameter; and
a client configured to display a webpage including a plurality of panels, each panel providing a different type of information corresponding to the cached data, a first one of the plurality of panels including an email inbox and a second one of the plurality of panels including a search engine interface, wherein the client is further configured to update at least one of the plurality of panels based on the metadata and the received information responsive to the determination that the external data has changed.

13. The system of claim 12, wherein the determination is based at least in part on a control message received by the web server from the application server.

14. The system of claim 12, wherein the application server is further configured to send a custom tag to the web server, the custom tag corresponding to the cached data.

15. The system of claim 14, wherein the web server is further configured to send a control message to the application server responsive to the custom tag.

16. The system of claim 15, wherein the application server is further configured to revise the control message by inserting update information into the control message and return the revised control message to the web server.

17. The system of claim 16, wherein the inserted update information comprises the changed external data.

18. The system of claim 12, wherein the web server is further configured to retrieve the external data directly from the external data source via the application server.

19. The system of claim 12, wherein each different type of information further includes at least one of a group consisting of the following: a listing of links to recently-accessed documents, a listing of communities, and a listing of current headlines.

* * * * *